United States Patent
Pettay et al.

(10) Patent No.: US 9,495,963 B1
(45) Date of Patent: *Nov. 15, 2016

(54) SCRIPT COMPLIANCE AND AGENT FEEDBACK

(71) Applicant: Alorica Business Solutions, LLC, Irvine, CA (US)

(72) Inventors: Mark J. Pettay, Omaha, NE (US); Jill M. Vacek, Blair, NE (US)

(73) Assignee: Alorica Business Solutions, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/848,080

(22) Filed: Sep. 8, 2015

Related U.S. Application Data

(63) Continuation of application No. 13/940,348, filed on Jul. 12, 2014, now Pat. No. 9,131,052, which is a continuation of application No. 13/705,919, filed on Dec. 5, 2012, now Pat. No. 8,504,371, which is a continuation of application No. 13/540,808, filed on Jul. 3, 2012, now Pat. No. 8,352,276, which is a continuation of application No. 12/767,342, filed on Apr. 26, 2010, now Pat. No. 8,229,752, which is a continuation of application No. 10/670,126, filed on Sep. 24, 2003, now Pat. No. 7,739,115, which is a continuation-in-part of application No. 09/785,048, filed on Feb. 15, 2001, now Pat. No. 7,191,133.

(51) Int. Cl.
| | |
|---|---|
| H04M 3/51 | (2006.01) |
| G10L 15/26 | (2006.01) |
| G10L 21/00 | (2013.01) |
| G10L 25/51 | (2013.01) |
| G10L 15/14 | (2006.01) |

(52) U.S. Cl.
CPC .............. *G10L 15/26* (2013.01); *G10L 15/14* (2013.01); *G10L 25/51* (2013.01); *H04M 3/5175* (2013.01); *H04M 3/5191* (2013.01)

(58) Field of Classification Search
CPC . H04M 3/5175; H04M 3/5191; G10L 15/14; G10L 15/26; G10L 25/51
See application file for complete search history.

(56) References Cited

U.S. PATENT DOCUMENTS

| | | | | |
|---|---|---|---|---|
| 5,613,037 A * | 3/1997 | Sukkar | .................. | G10L 15/142 704/251 |
| 5,826,240 A * | 10/1998 | Brockman | ....... | G06Q 10/06311 705/7.13 |
| 6,567,787 B1 * | 5/2003 | Walker | ............. | G06Q 10/06398 704/273 |
| 7,191,133 B1 * | 3/2007 | Pettay | ............... | G06Q 10/06398 379/265.06 |
| 7,739,115 B1 * | 6/2010 | Pettay | ..................... | G10L 15/26 379/265.06 |
| 8,229,752 B1 * | 7/2012 | Pettay | ..................... | G10L 15/26 379/265.06 |
| 8,352,276 B1 * | 1/2013 | Pettay | ..................... | G10L 15/26 704/235 |
| 8,504,371 B1 * | 8/2013 | Vacek | ..................... | G10L 15/26 379/265.06 |
| 9,131,052 B1 * | 9/2015 | Pettay | ..................... | G10L 15/26 |

* cited by examiner

*Primary Examiner* — Harry S Hong

(57) ABSTRACT

Systems and methods are provided for using automatic speech recognition to analyze a voice interaction and verify compliance of an agent reading a script to a client during the voice interaction. In one aspect of the invention, a method may include a voice interaction, wherein the agent follows the script via a plurality of panels. The voice interaction is evaluated via the plurality of panels employing panel-by-panel playback with an automatic speech recognition component adapted to analyze the voice interaction. As such, it may be determined, via generating a score using confidence level thresholds of an automatic speech recognition component such that confidence level thresholds are assigned to each of the plurality of panels and evaluating the score against at least one of a static standard and a varying standard, whether the agent has adequately followed the script.

20 Claims, 6 Drawing Sheets

SCRIPT COMPLIANCE AND AGENT FEEDBACK

CROSS-REFERENCE TO RELATED APPLICATIONS

This application is a continuation of U.S. patent application Ser. No. 13/940,348, filed Jul. 12, 2014, entitled "SCRIP COMPLIANCE AND AGENT FEEDBACK", now issued U.S. Pat. No. 9,131,052, issued on Sep. 8, 2015, which is a continuation of U.S. patent application Ser. No. 13/705,919, filed Dec. 5, 2012, entitled "SCRIPT COMPLIANCE AND AGENT FEEDBACK", now issued U.S. Pat. No. 8,504,371, issued on Aug. 6, 2013, which is a continuation of U.S. patent application Ser. No. 13/540,808, filed Jul. 3, 2012, entitled "SCRIPT COMPLIANCE AND AGENT FEEDBACK", now issued U.S. Pat. No. 8,352,276, issued on Jan. 8, 2013, which is a continuation of U.S. patent application Ser. No. 12/767,342, filed Apr. 26, 2010, entitled "SCRIPT COMPLIANCE AND AGENT FEEDBACK", now issued U.S. Pat. No. 8,229,752, issued on Jul. 24, 2012, which is a continuation of U.S. patent application Ser. No. 10/670,126, filed on Sep. 24, 2003, entitled "SCRIPT COMPLIANCE AND AGENT FEEDBACK" now issued U.S. Pat. No. 7,739,115, issued on Jun. 15, 2010, which is a continuation-in-part of U.S. patent application Ser. No. 09/785,048, filed on Feb. 15, 2001, entitled "SCRIPT COMPLIANCE USING SPEECH RECOGNITION" now issued U.S. Pat. No. 7,191,133, issued on Mar. 13, 2007. The benefit of the filing date of these applications is hereby claimed to the fullest extent permitted under 35 U.S.C. §120, and the text of such applications is incorporated herein by this reference as if set forth herein verbatim.

SUMMARY OF THE INVENTION

Apparatus and methods are provided for using automatic speech recognition technology to analyze a voice interaction and verify compliance of an agent reading a script to a client during the voice interaction. The apparatus and methods are particularly suited for use in any situation where a voice interaction takes place in which at least one participant is obliged to follow a prepared script, and are particularly suited for use in the operation of a call center, such as, for example, to evaluate or verify that call center agents are properly reciting scripts during telephone or web-based calls to or from call center customers.

In one aspect, a communications system includes a voice communications network providing voice connectivity between a system user and a call center. The call center preferably includes a call control device for receiving and routing calls, one or more agent workstations at which an agent is able to process an incoming or outgoing call, and a script compliance module for analyzing a voice interaction between the system user and the agent. The system user is able to access the communications system with any type of voice communications device, including, for example, a telephone, a voice-capable computer, or a wireless communications device. The voice communications network is provided with any form of voice communications capability needed to support the user's voice communications device, such as a digital communications network, standard telephone network, internet-based, or wireless network. The call control device provides the functions of receiving the voice communication from the communications network and routing the call to the agent workstation. The agent workstation will typically include a telephone and a computer, with the computer being optionally networked to a database for data access by the agent.

The script compliance module is provided with an automatic speech recognition (ASR) component, such as that provided by a speaker-independent, continuous speech, multilingual, multi-dialect ASR component such as those known in the art. The ASR component is adapted to receive a digital signal representing a voice interaction between the system user and the agent, and to provide an output of an analysis of the digital signal for use in a quality assurance (QA) process.

In another aspect, a method is provided for analyzing a voice interaction and verifying compliance of an agent reading a script to a client during the voice interaction, for example, as part of a telemarketing campaign. The voice interaction preferably takes place between a system user and an agent over the communications network, but may alternatively be a face-to-face voice interaction or any voice interaction capable of being captured and analyzed by an ASR component. The agent may be physically located within the call center, or may be at a distant location, but the voice interaction is preferably routed through the call control device at the call center. In the preferred embodiment, the agent is responsible for referring to and following a prepared script for at least a portion of the voice interaction. The voice interaction is captured, converted to digital form, and exposed to the ASR component, in real-time or in a recorded form, and the ASR component analyzes at least a portion of the voice interaction. The analyzed portion is compared against a standard, preferably the expected content from the prepared script or script portion associated with the given portion of the voice interaction, and a determination is made concerning the extent to which the agent complied with the script during the voice interaction. For example, one or more portions of the voice interaction may be assigned a score to indicate a level of script compliance by the agent, as determined by the ASR component, and taking into account any limitations (e.g., confidence-level thresholds) in the ASR component's ability to evaluate the voice interaction.

In yet another aspect, one or more actions are taken based upon the above script compliance determination. In a preferred embodiment, these actions are taken as part of a quality assurance or employee incentive program. The actions include, for example, sending the voice interaction to a quality assurance monitor for review, assigning the agent for random voice interaction review, sending an e-mail or other flag to an oversight authority for review, sending a voice or text message to the agent, updating a file associated with the agent, updating an incentive program to reflect the compliance determination, or other such actions.

In yet another aspect, a scripting package and quality assurance process are constructed to provide panel-level review of a voice interaction during the quality assurance process. The scripting package preferably includes a plurality of call scripts used by the agent during the voice interaction, a log record layout including provision for each value logged during the voice interaction, and a plurality of ASR reference texts corresponding with the plurality of call scripts. The voice interaction is recorded and logged, including a timestamp and time displacement for each script panel occurring during the voice interaction. The quality assurance process includes a provision for retrieving and reviewing the recorded voice interaction by panel level. Accordingly, if a script compliance scoring system is used, the score may be retrieved and reviewed for each panel forming a part of the voice interaction without having to review the entire voice interaction.

Several advantages are obtained through use of the apparatus and methods so described. For example, the described apparatus and method provide a script compliance function having a wide range and scope of applications at a relatively minor expense when compared to non-automated management systems. By employing an ASR component to analyze and evaluate the voice interactions, a call center provider can decrease or avoid the need to have individual managers or other call reviewers perform those functions. This becomes particularly advantageous to call centers having several agents, perhaps dozens or hundreds, or where the agents are not physically located on the call center premises.

A further advantage obtained by the present apparatus and methods is the ability to provide useful information concerning agent script compliance to a quality assurance (QA) authority in a time-effective manner. For example, when the apparatus and methods are used in real-time, a report may be submitted automatically to a QA authority almost immediately after a given voice interaction is completed. Where the voice interaction is recorded and reviewed later, time delays may still be minimized. In addition, near instantaneous feedback may be given to an agent to attempt to minimize problems with script compliance.

A still further advantage of the described systems and methods is the provision of panel-level playback and review of a voice interaction in the quality assurance process. This provides more effective and efficient methods of quality assurance in, for example, a call center operation.

Other and further advantages are described below and still others will be apparent from a review of the descriptions contained herein.

The communications systems and script compliance methods may optionally include additional, or fewer, features and functionality than those described herein for the preferred embodiments while still obtaining the benefits described. The inventions described herein are not limited to the specific embodiments described, or to the specific equipment, features, or functionality described for the apparatus and methods of the examples contained herein. These examples are provided to illustrate, but not to limit the inventions described.

The preferred embodiments include several aspects generally directed to voice communications apparatus and methods, several of which are described below. The primary preferred embodiment is a script compliance apparatus and method particularly adapted for use in a call center, and most particularly in a telemarketing application. While this embodiment is described in detail herein, it will be understood by those skilled in the art that other and further aspects and applications are possible. For example, the systems and methods may be adapted for use in call centers for applications other than telemarketing, or for voice interactions not associated with call centers or telemarketing operations. The following description is not intended to limit the scope of the described inventions, which are instead set forth in the appended claims.

DETAILED DESCRIPTION OF THE INVENTION

Figure 1:
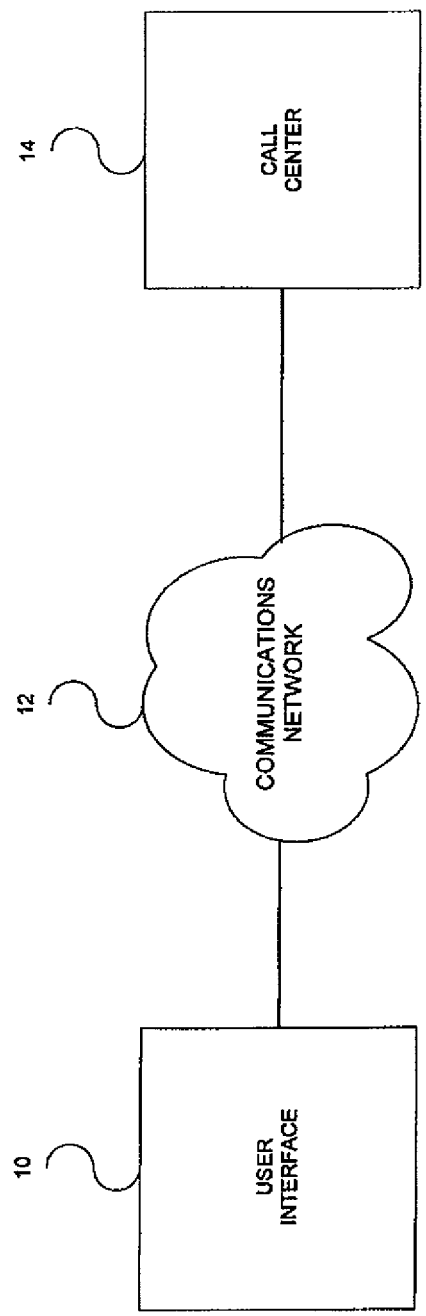
FIG. 1 is a block diagram demonstrating aspects of a communications system.

FIG. 1 shows a block diagram of one implementation of the apparatus and methods of these inventions. The diagram in FIG. 1 reflects aspects of a call center implementation, though it will be understood that the various structures and functionalities may be extended to other implementations, including face-to-face voice interactions, electronic commerce, telephone, web, or wireless-based based information services, and the like. The communications system shown in FIG. 1 includes a user interface 10, a communications network 12, and a call center 14, each described in further detail below.

The user interface 10 provides the function of allowing a system user, such as a telemarketing customer, to conduct a voice communication with a telemarketing services provider. The user interface 10 may be a standard function telephone, a video telephone, a wireless communication device, an internet-based communication device, or other instrument adapted to support voice communication. In the preferred embodiment, the user interface is a standard telephone.

The communications network 12 provides the function of transmitting a voice signal between the user interface and the call center. Accordingly, the communications network 12 may include an analog or digital telephone network, an internet-based network, a wireless network, or any voice communications supporting network. The communications network 12 supports voice communications between a system user using the user interface communication device and, in the preferred embodiment, the call center 14. In the preferred embodiment, the communications network is a standard telephone service network provided by a long distance and/or local service carrier such as AT&T, Sprint, MCI, or others.

The call center 14 serves as a call termination and servicing point, and may be provided having any number of features, functions, and structures. In the typical call center, a call control component is provided to automatically receive and route calls to one or more telemarketing agents working at agent workstations within the call center. An agent workstation may include only a telephone, but it is typically provided with a networked computer and terminal used to support the agent functions. For example, a central database containing customer information and information relating to goods, services, or other offerings being provided by the telemarketer is typically provided and is accessible by the computers and terminals located at the agent workstations. When a telemarketing call is being processed, information relating to that call (e.g., customer identification information, product offerings information, credit card information, etc.) are automatically sent by the central database to the agent terminal in a "screen pop." The agent then reads information from the computer terminal as the call is processed, and enters new information as it is obtained during the call.

Figure 2:
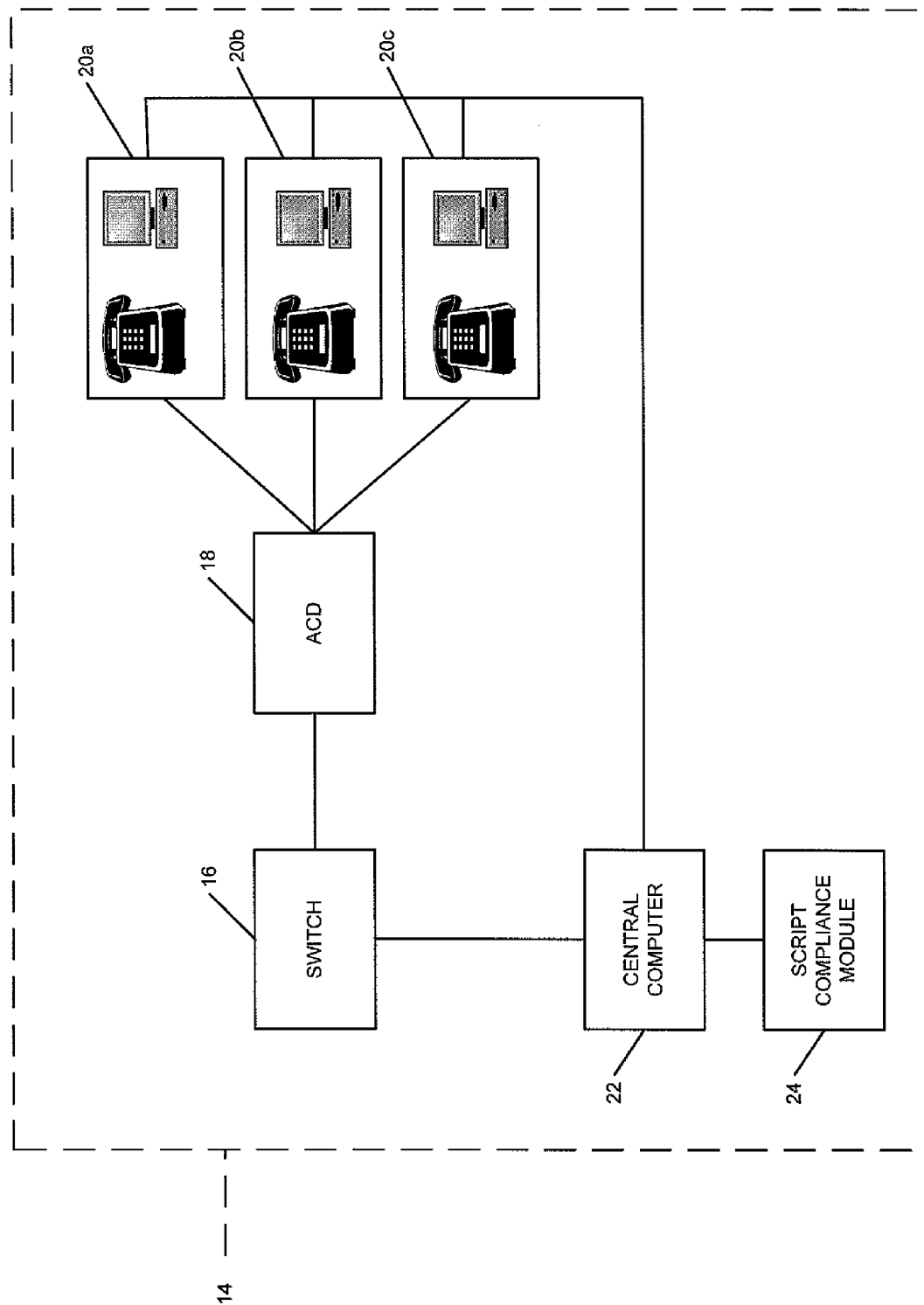
FIG. 2 is a block diagram showing a call center implementation of the described communications system.

FIG. 2 shows additional details of the call center 14 and, in particular, an embodiment representing an inbound call center. The call center 14 includes a programmable switch 16 that operates to receive incoming calls and to provide an interface for access to calls, call data, and other call center operations. The call center also preferably contains an automatic call distributor (ACD) 18 for routing calls to agents according to pre-determined criteria. While these primary functions of the switch and ACD are described, other details and functions of these devices are generally known in the art, and will not be discussed here.

Three agent workstations 20a-c are shown in the call center in FIG. 2. It is possible to have any number of agent workstations at the call center or, alternatively, to provide off-site agents that are able to access the call center remotely by another voice communications network not shown. In the case of an inbound telemarketing campaign using multiple agents, the switch and ACD cooperate to route calls to the appropriate location where an agent is able to process the calls. The agent workstation also includes a computer terminal at which data may be accessed by the agent. Typical call centers utilize computer-telephone integration (CTI) in which telephone number information (automatic number identification (ANI) or dialed number information service (DNIS)) is associated with other customer information stored on a database that is then accessed in real-time during a telemarketing call and a "screen pop" containing this information occurs at the agent workstation terminal. Additional information concerning the goods, services, or other offerings is also provided to the agent workstation terminal. A central computer 22 is shown in FIG. 2 having a network connection to each of the agent workstations, and a connection to the switch to obtain caller information from the incoming call. The details of the central computer and network are beyond the scope of the present inventions, and are therefore not discussed further here. Moreover, it is typical to provide a call center with other features and functions desired for a given call center application. Although these additional features and functions are not explicitly described herein, those skilled in the art will recognize that they may be added to the described system consistent with the needs of the given application.

In a particular preferred form, data is provided to the agent workstations during calls in a series of "panels", with each panel being associated with a particular script or portion of a script. The scripts are prepared as a part of a telemarketing campaign, and include the information needed to be given to the customer in a form intended to be effective and efficient to achieve its purpose. In particular, in a typical campaign, a telemarketer strives to obtain the most efficient result in the shortest transaction time in order to decrease on-line costs. The scripts are, therefore, typically highly-developed and tested to determine their effectiveness. A telemarketing campaign can be significantly undermined by an agent's failure to closely follow a script.

In addition, by presenting script information in panel form, a quality assurance process may preferably be coordinated with the scripting process to provide panel-level playback. This panel-level playback, as opposed to the need to play back and/or navigate through an entire telemarketing voice interaction to review a certain portion of it, is a significant advantage provided by the described system.

Accordingly, a script compliance module 24 is included in the call center. The script compliance module 24 is a software package that is shown in FIG. 2 as having an interface with the central computer, but its location within the call center is optional, as long as access is available to the digitized voice interaction. The script compliance module 24 performs several functions within the call center, as set forth in more detail below. The script compliance module includes an advanced speech recognition (ASR) component whereby a voice interaction between a customer and an agent may be analyzed and evaluated for compliance with an expected standard. As discussed below, the script compliance module may be constructed to operate in real-time, i.e., as the voice interaction takes place, or, preferably, it may include a recording capability such that voice interactions are reviewed and evaluated at a later time.

The ASR component of the script compliance module is supported by providing an appropriate ASR software package. These ASR software packages are commercially available, and examples include those available from Nuance Communications (Menlo Park, Calif.) and Speechworks International, Inc. (Boston, Mass.). A detailed description of speech recognition technology is not necessary to understand the systems and methods described herein. Briefly, however, the ASR component is adapted to capture a voice signal and convert it to digital form (if not presented to the ASR component in digital form already). The digital signal is then converted to a spectral representation that undergoes an analysis to match the spectral representation to a written vocabulary, and converts the voice signal to written text. Currently available systems are able to analyze continuous, multi-lingual, multi-dialect speech from in a speaker-independent manner and convert it to its corresponding text form.

As noted, the script compliance module 24 may be adapted to operate in real-time by including a component for converting the voice interaction to digital form for direct analysis by the ASR software package. In that case, the voice interactions are preferably captured live and fed directly to the digital converter and the ASR software package for analysis. Optionally, the script compliance module 24 may be adapted to analyze recorded voice interactions. In particular, and preferably, the script compliance module 24 or other system component may include one of the commercially available audio recording and monitoring systems such as those available from NICE Systems Ltd. or Witness Systems, Inc. In such a case, the voice interaction recorded by the audio recording and monitoring system may supply audio files to the ASR software package for analysis. Because recordings of the voice interactions may be useful to a call center administrator for other purposes, related or not to script compliance, the preferred embodiment includes a voice interaction recording component such as those described above.

Figure 3:
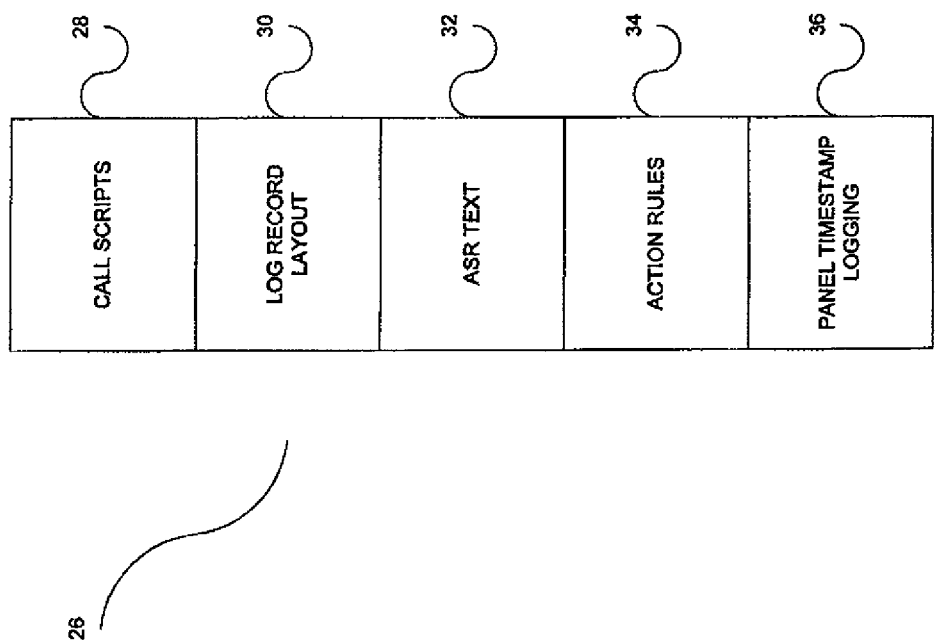
FIG. 3 is a block diagram of a scripting package for use in the described communications system and methods.

The script compliance module 24 preferably includes a scripting package 26, discussed in more detail below. The scripting package 26 is depicted graphically in FIG. 3, and includes the following components:

First, one or more call scripts 28 are provided. The call scripts 28 may be maintained in the script compliance module, or, preferably, they may be maintained on the central computer and accessible by the script compliance module. The call scripts 28 are accessed during the voice interaction and contain the information to be read by the agent to the customer during the voice interaction. As noted above, the call scripts 28 are preferably presented in separate panels containing discrete portions of the overall call script. As an agent progresses through a call, the agent moves from a first panel, to a second, to a third, and so on. A single offer of a good or service may be contained on a single panel, or on several panels. Alternatively, several offers may be presented during a single call.

Second, a log record layout module 30 is provided. A log record is preferably created for each voice interaction taking place at the call center. The log record layout includes data fields for all data that could be captured during calls, and log records are maintained as part of the ongoing function of the call center. The data fields will, of course, vary based upon the operation of the call center. Typical data fields will include date and time of call, length of call, agent identity, customer identity, and any transaction data obtained during the call. Some data fields may be filled automatically during a call, such as date, time, agent identity, and the like, while others may be filled by the agent during the call.

Third, an ASR text module 32 is provided. The ASR text is a reference text to be used by the ASR component of the script compliance module, and corresponds to the call scripts described above. As with the call scripts, the ASR text is preferably provided in separate panels.

Fourth, a set of action rules 34 is provided. In the most general sense, the action rules take the output of the ASR component evaluation of the voice interaction and, based thereon, direct an action to be taken by another component of the script compliance module. The output of the ASR component evaluation may comprise, for example, a numerical score indicating the degree to which the voice interaction complied with the ASR text. The actions directed by the set of action rules may comprise, for example, a quality assurance (QA) action to be taken based upon the numerical score. For example, scores less than 60 may be sent to a QA authority for review, scores between 60 and 80 may have random calls selected for review by a QA authority, and scores over 80 may be used to drive a QA incentive program. These are examples only. The determination of specific standards and actions will depend, of course, on the type of application.

Fifth, a panel timestamp logging feature 36 is provided. The panel timestamp logging feature assigns a time displacement timestamp to each panel as it is presented and viewed by an agent during a voice interaction with a customer. For example, in a voice interaction in which a first panel is processed in 15 seconds and a second panel is processed in 12 seconds, the first panel will log from 0:00:00 to 0:00:15 (i.e., the duration of the voice interaction relating to the first panel) and the next panel will log from 0:00:16 to 0:00:27. This progression continues for each panel used during the voice interaction. A log of the timestamps is maintained for each voice interaction. The timestamps are then preferably used in the quality assurance process to facilitate panel-level playback of the voice interaction.

Figure 4:
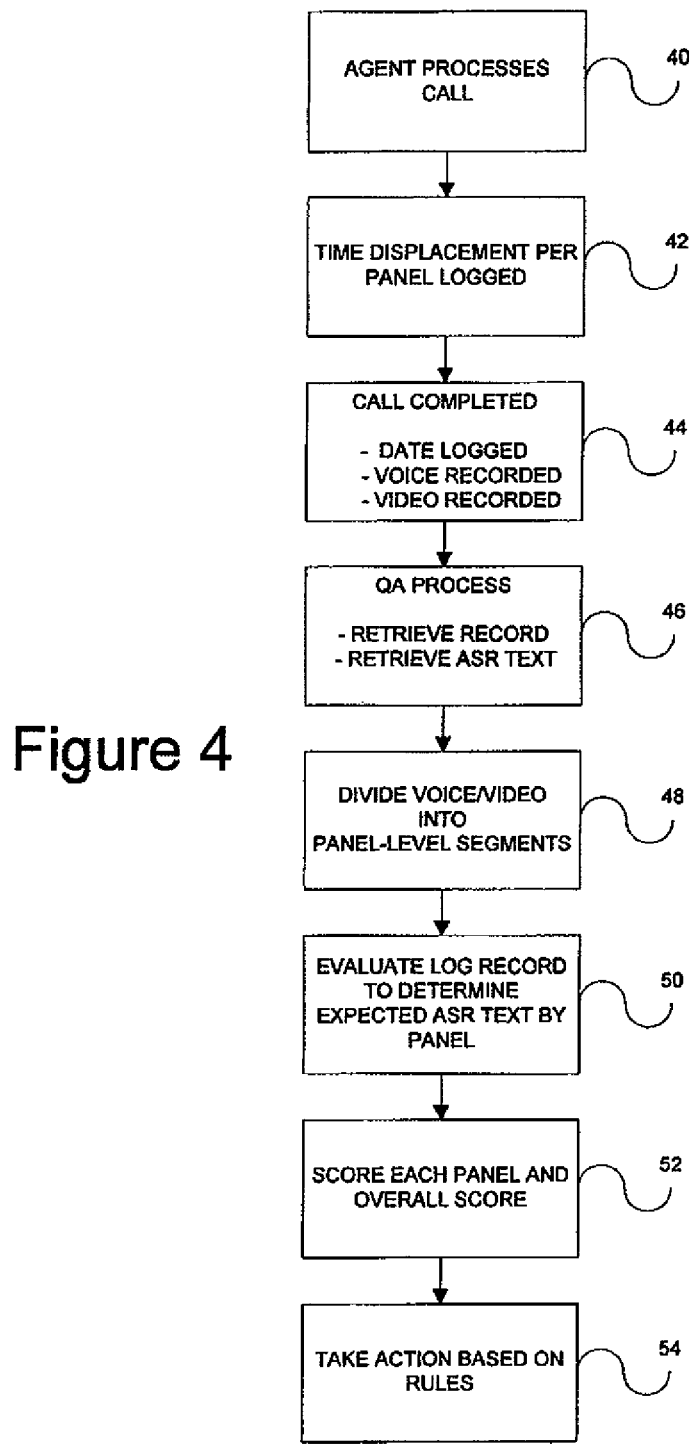
FIG. 4 is a block diagram of a quality assurance logging process and quality assurance method.

The communications system operation will now be described in reference to FIG. 4, and in the context of a telemarketing call. A telemarketing agent and a customer engage in a voice interaction during which the agent processes the call 40, i.e., the agent reads from scripts presented on the workstation terminal and enters information in the fields provided according to responses obtained from the customer. As noted above, the scripts are preferably presented to the agent in panels, with each panel corresponding to a portion of the overall script, or to a separate script. The time displacement per panel is logged 42 as a portion of the log record. Once the call is completed 44, all data obtained during the call is logged according to the log record layout. If a voice recording or video recording are made, they too are logged and stored for later use in the QA process.

The QA process 46 is next begun by retrieving the voice interaction record. The log record is also retrieved and reviewed to determine which scripts were to have been recited by the agent, and the corresponding ASR texts are retrieved for the ASR analysis. The voice and/or video recording is preferably divided into panel-level segments 48 for review and evaluation, and the log record is evaluated 50 to determine the expected ASR text by panel. A comparison of the voice interaction with the ASR text is then performed by the ASR component in order to determine the degree of compliance of the voice interaction with the ASR text. In the preferred embodiment, the ASR component assigns scores 52 based upon the level of accuracy of the comparison. Confidence-level thresholds are used in evaluating the match accuracy. After each panel is evaluated and scored, an overall score may be determined. The panel-level scores and overall scores are next used to determine any action 54 to be taken as provided in the pre-determined set of action rules. Examples of such actions include sending an e-mail containing the file for review, providing a feedback message to the agent, or other actions tailored to the particular application.

As an extension of the QA process, the stored voice interaction and log records may be retrieved from the system by a QA authority at a later time for additional analysis. The records may be used to review the assigned panel-level and/or overall compliance scores. In addition, all or a portion of the voice and/or video recording may be played back for analysis. The logging process included in the scripting package allows panel-level playback of the voice interaction either in conjunction with, or independent from the ASR analyzing function of the system.

Figure 5:
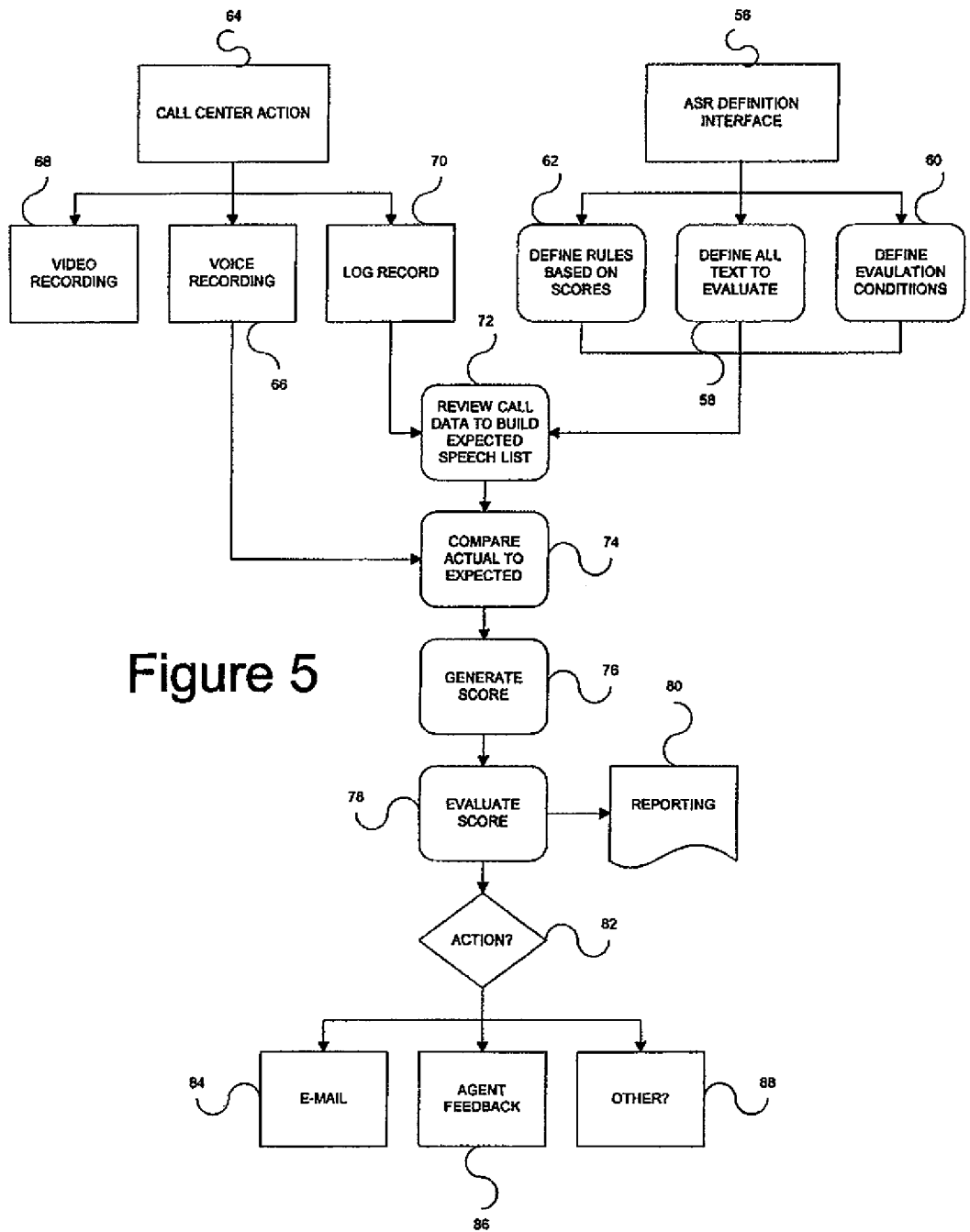
FIG. 5 is a block diagram showing a number of call center actions forming part of the communications system and methods.

A block diagram providing an additional representation of the call center actions is shown in FIG. 5. The ASR Interface 56 is used to set the initial conditions of the ASR component of the script compliance module. The initial conditions of the ASR component include the definitions of the ASR texts 58, the definitions of the evaluation conditions 60—i.e., the point in time during a voice interaction a given ASR text is expected to be read—and the action rules 62, discussed above. Any changes or modifications to the initial conditions are made by accessing these features via the ASR Interface 56 and making the desired changes.

When a call is processed 64, a voice recording is made 66 and, optionally, a video recording 68 is made. Each of these recordings may be separately logged and stored for later retrieval as needed. A log record 70 is created of the voice interaction during the call and is used, along with the ASR initial conditions, to build an expected speech list 72 to which the voice recording will be compared. For example, as a call is processed, the agent will view, read from, and enter information into several panels according to the nature and flow of the call. The interactive logic concerning all branching of the scripts and panels provided to the agent during the call is maintained on the central computer or, alternatively, in the script compliance module, and dictates which call scripts are presented to the agent at each step of the call. The evaluation conditions contain the information coordinating the voice interaction, scripts, panels, and ASR texts. These are used to build the expected speech list.

The actual voice recording is then compared 74 to the ASR text to determine compliance. A score is generated 76 indicating the measured compliance, taking into account the confidence-level thresholds of the ASR component, and the score is evaluated 78 against pre-determined standards. The pre-determined standards may be static or may vary, and may be included in the ASR evaluation conditions. For example, an 80% accuracy score may be sufficient for one script or script portion, but a 90% accuracy score may be required for another script or portion. The score and evaluation may be added to a report 80 of the call for later retrieval. An action 82 is next taken based upon the score according to the pre-determined set of action rules. Examples of these actions include e-mailing a report (which may optionally include a copy of the digital recording of the voice interaction) to a QA authority 84, providing a feedback message directly to the agent 86, or any other 88 action appropriate for the given application.

Figure 6:
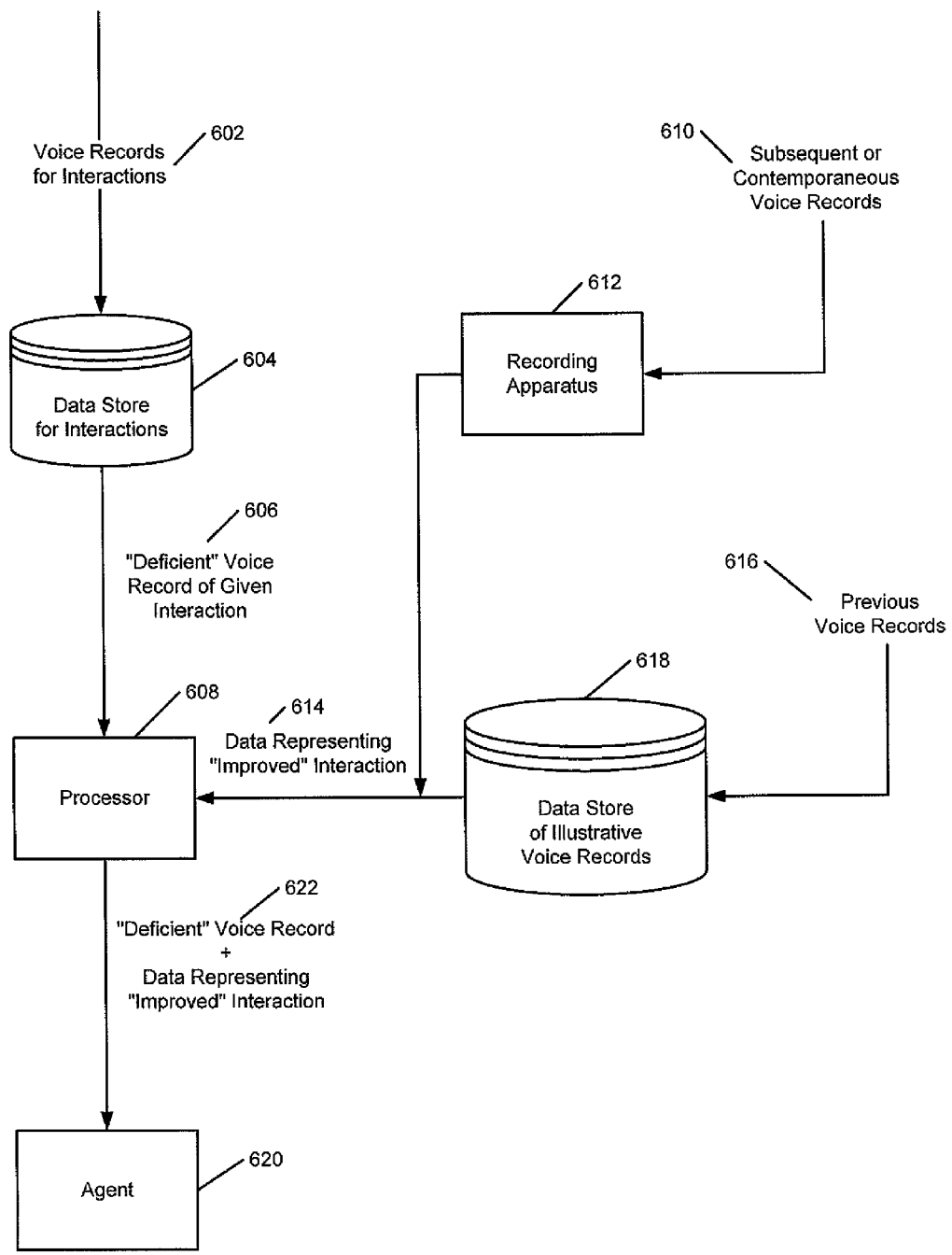
FIG. 6 is a data flow diagram illustrating processing and components related to providing feedback to agents on particular aspects of their handling of given interactions.

FIG. 6 is a data flow diagram illustrating processing and components related to providing feedback to agents on particular aspects of their handling of given interactions. These aspects provide methods, systems, and computer-readable media for improving agent performance, with the method including at least identifying one or more interactions 602 that are or were handled by one or more given agents 620, with these interactions being deficient in some aspect. A voice record 606 of at least a portion of a deficient interaction is obtained, along with a further voice record 614 of at least a portion of another interaction in which the at least one aspect is not deficient. Data 622 representing at least the portions of the voice record and the further voice record are then transmitted as feedback to the agent 620 conducing the interaction.

Typically, but not necessarily exclusively, the deficiency referenced above involves at least one metric related to quality assurance (QA), and identifying the deficiency may include identifying a QA-related metric that is applicable to an interaction. Thus, identifying a "deficient" interaction can include analyzing given interactions against one or more QA-related parameters or metrics, and determining that the agent 620 failed to meet these parameters or metrics during one or more interactions. These metrics can deal with script compliance issues, as discussed above, wherein one or more scripts govern the agent's conduct of given interactions with third parties. Other illustrative but non-limiting examples of such metrics can involve general capture and entry of data provided by these third parties (addresses, credit card numbers, etc.) into computer-based systems, responding correctly to questions posed by these third parties, correct pronunciation of product names, or the like. These metrics can also be somewhat subjective in nature, focusing in matter such as pace of the interactions, tone and manner of the agent's voice, and the like.

Voice records 602 for interactions that are processed according to the teaching herein can include at least a portion of one or more interactions processed by an agent physically located at a call center, which can be either an in-house call center run by a given company or firm, or a third-party call center to which such companies or firms might outsource call-handling functions. Conversely, the voice records can be created to store data resulting from or relating to interactions handled by an agent physically located in a location remote from a call center. Such agents are known as remote agents, or if the agent is working from his or her residence, as a "home agent" or "home-based agent". In the context of home- or remotely-based agents, such agents are not subject to immediate, in-person supervision, so the need to proactively detect and investigate script compliance or QA issues of the type discussed herein can be particularly acute with these agents, perhaps even more so than with call center-based agents who are supervised in-person. Finally, the invention as described herein can be deployed at a call center that either receives incoming or inbound calls or that generates or originates outgoing or outbound calls. In any event, a data store 604 can store or archive these voice records 602 for analysis.

The second or further voice record 614 that is provided as at least a part of the feedback to the agent 620 can be obtained from at least a portion of a pre-recorded interaction that is stored in a library or data store 618 containing one or more exemplary voice records made available for future reference. This data store 618 can be adapted to correlate respective portions of a pre-defined script governing at least part of various types of interactions to respective fields in the data store 618 that store respective suggested voice records 616 corresponding to those portions of the script. However, if a pre-existing voice record 616 suitable for feedback to the agent 620 is not available in the data store or library 618, at least a portion of a suitable voice record 610 for another interaction that occurs contemporaneously with or subsequently to the interaction at issue can be recorded using known recording apparatus 612 and provided to the agent 620.

In any event, the second or further voice record 614 is provided to the agent 620 as an exemplar, guideline, example, constructive criticism, or suggestion for improving the performance of the agent 620. This audio or vocal feedback 622 can be valuable in instances where merely providing a textual representation of the second or further voice record 614 (such as the output of a speech recognition engine) would not be as helpful, for example, when the aspect of the agent's performance needing improvement centers on tone-of-voice or other similar parameters. Also, more than one further voice records 614 can be provided as exemplars, as the case may be.

Once the deficient aspect of the given interaction is identified and the second or more voice records 614 are obtained as exemplars, the deficient voice record 606 and the exemplar voice record 614 can be transmitted as feedback 622 to the agent 620, for example by emailing data representing the voice record 606 and the further voice record 614 to the agent 620. Various known transmission methods may be chosen to realize this function by those skilled in the art, given the teaching herein and the requirements of a given application.

Further aspects of the invention can include transmitting to the agent 620 one or more representative screen shots of a computer screen that are related to whatever aspect of the agent's performance needs improvement. As a non-limiting example, if an agent 620 has persistent trouble with accurate data entry, the screen shot might depict a computer screen with particular areas highlighted where the agent 620 made mistakes in such data entry. In general, the screen shots may help further to reinforce the feedback 622 to the agent 620 when the screen shots provided in connection with the voice records 606 and 614. Also, where script compliance issues arise, a portion of the script with which the agent 620 was non-complaint may be transmitted to the agent 620 to enable the agent 620 to focus on that portion when handling future similar interactions. In other cases, the feedback 622 transmitted to the agent 620 could include pointers or other links directing the agent 620 to remedial or training materials that address whatever aspect of the agent's performance needs attention. These remedial or training materials can include either hard copies of training manuals or documents, software-based instruction materials, or portions of both.

For agents 620 physically located in call centers, it may be necessary to convert the voice records into a format suitable for transmission to the agent 620, for example, between a format suitable for storage or archival in a central data store into a format suitable for e-mail or other transmission. This conversion can also include employing compression algorithms or the like as may be necessitated by bandwidth limitations or constraints applicable to data transmissions within the call center enterprise. Similar considerations may hold with home-based or remote agents 620 physically located remotely from the call center, given limitations or constraints applicable to data transmissions outside the call center enterprise to such agents 620. Such format or protocol conversions related to such data transfers are well known in the art.

A suitable application program can implement software residing on the computer-readable medium or media readable and executable by the processor 608 and embodying the various aspects of the method discussed herein and shown in the drawing figures, and can be coded using any suitable programming or scripting language. However, it is to be understood that the invention as described herein is not dependent on any particular operating system, environment, or programming language. Illustrative operating systems include without limitation LINUX, UNIX, or any of the Windows™-family of operating systems, and illustrative languages include without limitation a variety of structured and object-oriented languages such as C, C++, Visual Basic, or the like. Likewise, the invention as described herein is not dependent on any particular make or model of processor 608. Instead, any commercially available microprocessor or central processing unit (CPU) may be suitable, depending on the circumstances of a given application of the invention.

As those skilled in the art will understand, the program of instructions can be loaded and stored onto a program storage medium or device readable by the processor 608 or other machine, embodying a program of instructions executable by the processor 608 to perform the various aspects of the invention as discussed and claimed herein, and as illustrated in the drawing figures. Generally speaking, the program storage medium can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device can be affixed permanently or removably to a bay, socket, connector, or other hardware provided by the cabinet, motherboard, or other component of a given computer system.

Those skilled in the art will also understand that a computer programmed in accordance with the above teaching using known programming languages provides suitable means for realizing the various functions, methods, and processes as described and claimed herein and as illustrated in the drawing figure attached hereto.

Those skilled in the art, when reading this description, will understand that unless expressly stated to the contrary, the use of the singular or the plural number herein is illustrative, rather than limiting, of the instant invention. Accordingly, where a given term is discussed in the singular number, it will be well understood that the invention also contemplates a plural number of the item corresponding to the given term and vice versa, unless expressly stated herein to the contrary.

Those skilled in the art will further recognize that for the purposes of convenience, legibility, and clarity, FIG. 6 illustrates the various data stores 604 and 618 separately, and they are discussed separately herein. However, the embodiment shown in FIG. 6 is illustrative rather than limiting, and that some or all of these various data stores could readily be combined or consolidated into one or more data stores without departing from the scope of the invention.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims.

The foregoing cited references, patents and publications are hereby incorporated herein by reference, as if fully set forth herein. Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

The invention claimed is:

1. A method, comprising:
   analyzing, by at least one automatic speech recognition component, at least one voice interaction by at least one agent following at least one script in at least one of a plurality of panels; and
   determining whether the at least one agent has adequately followed the at least one script based on a score using confidence level thresholds of the least one automatic speech recognition component such that confidence level thresholds are assigned to each of the plurality of panels.

2. The method of claim 1 comprising evaluating the score against at least one of a static standard and a varying standard.

3. The method of claim 1 comprising determining whether the at least one agent has adequately followed the at least one script based on the evaluated at least one voice interaction.

4. The method of claim 1 comprising assigning a time displacement timestamp to each of the plurality of panels as they are presented and viewed by the at least one agent during the voice interaction.

5. The method of claim 4, wherein the at least one voice interaction is logged in a log record.

6. The method of claim 5 comprising logging a time displacement, based on the time displacement timestamp, per panel as a portion of the log record.

7. The method of claim 1, wherein the at least one voice interaction includes at least one voice interaction involving a telemarketing agent.

8. The method of claim 1, wherein the at least one voice interaction includes at least one voice interaction governed by at least one script that includes text corresponding to at least one offer of at least one of goods and services.

9. The method of claim 1, wherein the at least one voice interaction includes at least one voice interaction on at least one of a communications network, a publicly switched telephone network (PSTN), and the Internet.

10. The method of claim 1, comprising evaluating the at least one voice interaction which includes providing a script compliance module accessible via a user interface and a communications network, the communications network including at least one of an analog telephone, a digital telephone, an internet-based network, a wireless network, and a selected voice communications supporting network.

11. The method of claim 10, comprising converting the at least one voice interaction received via the communications network into at least one digital signal comprising at least one spectral representation of the at least one voice interaction.

12. The method of claim 11 comprising comparing the at least one digital signal to at least one reference standard that includes at least one known vocabulary.

13. The method of claim 12, comprising evaluating the at least one voice interaction which includes matching the at least one digital signal to at least one of words and phrases contained in the at least one reference standard.

14. A system, comprising:
at least one automatic speech recognition component configured to analyze at least one voice interaction by at least one agent that follows at least one script in at least one of a plurality of panels and to determine whether the at least one agent has adequately followed the at least one script based on a score, evaluated against at least one of a static standard and a varying standard, using confidence level thresholds assigned to each of the plurality of panels.

15. The system of claim 14, wherein each of the plurality of panels is related to the at least one automatic speech recognition component.

16. The system of claim 14, comprising an action component operable to cause at least one action to be taken.

17. The system of 16, wherein the at least one action is based upon a determination by the at least one automatic speech recognition component as to whether the at least one agent has adequately followed the at least one script.

18. The system of claim 16, wherein the at least one action is at least one signal transmitted to the at least one agent.

19. The system of claim 16, wherein the at least one action is at least one signal transmitted to at least one reviewing authority.

20. The system of claim 16, wherein the at least one action is an entry being made in a script compliance incentive system.

* * * * *